(12) United States Patent
Kitazawa

(10) Patent No.: US 10,684,168 B2
(45) Date of Patent: Jun. 16, 2020

(54) INFRARED DETECTION SYSTEM

(71) Applicant: Sharp Kabushiki Kaisha, Sakai, Osaka (JP)

(72) Inventor: Tazuko Kitazawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 92 days.

(21) Appl. No.: 15/933,437

(22) Filed: Mar. 23, 2018

(65) Prior Publication Data

US 2018/0299326 A1  Oct. 18, 2018

(30) Foreign Application Priority Data

Apr. 14, 2017 (JP) .................. 2017-080763

(51) Int. Cl.
*G01J 3/02* (2006.01)
*G01J 3/42* (2006.01)
(Continued)

(52) U.S. Cl.
CPC ............. *G01J 3/0297* (2013.01); *G01J 3/28* (2013.01); *G01J 3/42* (2013.01); *G01J 5/0014* (2013.01);
(Continued)

(58) Field of Classification Search
CPC ..... G01J 2003/2826; G01J 5/0862; G01J 3/32
See application file for complete search history.

(56) References Cited

U.S. PATENT DOCUMENTS 8,389,939 B1 *  3/2013  Stanley ............... B82Y 20/00
                                                 250/332
2005/0211873 A1  9/2005  Krishna et al.
(Continued)

FOREIGN PATENT DOCUMENTS

CN    103500766 A    1/2014
JP    10-96667 A     4/1998
(Continued)

OTHER PUBLICATIONS

Lin et al., "Voltage-tunable two-color quantum-dot infrared photodetectors", Applied Physics Letters, vol. 95 (12), 123504, Sep. 22, 2009, 3 pages.
(Continued)

*Primary Examiner* — Kenneth J Malkowski
(74) *Attorney, Agent, or Firm* — Keating & Bennett, LLP

(57) ABSTRACT

Infrared detection systems according to embodiments include an infrared detector, a storage, and a correction calculator. The infrared detector is configured to detect infrared light by absorbing and photoelectrically converting infrared light of a specific wavelength range. The infrared detector is capable of sweeping an absorption peak wavelength of an absorption spectrum of infrared light. The storage is configured to store a plurality of correction coefficients for correcting a detection value from the infrared detector in accordance with the absorption peak wavelength of the infrared detector with respect to a wavelength range of an atmospheric window. The correction calculator corrects the detection value from the infrared detector for each absorption peak wavelength using corresponding correction coefficients stored in the storage.

9 Claims, 19 Drawing Sheets

(51) Int. Cl.
*G01J 3/28* (2006.01)
*G01J 5/00* (2006.01)
*G01J 5/20* (2006.01)
*G01N 21/3504* (2014.01)

(52) U.S. Cl.
CPC ......... *G01J 5/20* (2013.01); *G01J 2003/2859* (2013.01); *G01N 2021/3531* (2013.01)

(56) References Cited

U.S. PATENT DOCUMENTS

| | | | | |
|---|---|---|---|---|
| 2006/0097176 A1* | 5/2006 | Szu | ...................... | A61B 5/0059 |
| | | | | 250/370.08 |
| 2011/0202323 A1* | 8/2011 | Choi | ...................... | B82Y 20/00 |
| | | | | 703/2 |
| 2014/0299772 A1* | 10/2014 | Guyot-Sionnest | ...... | H01L 31/09 |
| | | | | 250/338.4 |
| 2015/0136955 A1* | 5/2015 | Wein | .................. | H04N 5/37206 |
| | | | | 250/208.1 |
| 2015/0333201 A1* | 11/2015 | Sargent | ............... | H01L 31/0324 |
| | | | | 136/250 |

FOREIGN PATENT DOCUMENTS

| | | |
|---|---|---|
| JP | 2005-257358 A | 9/2005 |
| JP | 2007-003308 A | 1/2007 |
| JP | 2007-010421 A | 1/2007 |
| JP | 2007-178265 A | 7/2007 |
| JP | 2014-060321 A | 4/2014 |

OTHER PUBLICATIONS

Campbell et al., "Quantum-Dot Infrared Photodetectors by optimizing dot growth processes, materials have been produced that demonstrate potential, with further development, for high-performance infrared sensing", Proceedings of IEEE, vol. 95, No. 9, Sep. 2007, pp. 1815-1827.

* cited by examiner

FIG. 5

| WAVELENGTH λ (μm) | CORRECTION COEFFICIENT (FWHM 2 μm) | CORRECTION COEFFICIENT (FWHM 3 μm) |
|---|---|---|
| 8 | 2.00 | 2.00 |
| 9 | 1.13 | 1.27 |
| 10 | 1.01 | 1.06 |
| 11 | 1.00 | 1.02 |
| 12 | 1.01 | 1.06 |
| 13 | 1.14 | 1.28 |
| 14 | 2.00 | 2.00 |

FIG. 13

| λ(μm) | 30°C | 35°C | 40°C |
|---|---|---|---|
| 8 | 15.84732 | 17.33289 | 18.90461 |
| 9 | 28.23178 | 30.73461 | 33.37124 |
| 10 | 31.71405 | 34.30018 | 37.00773 |
| 11 | 30.92701 | 33.23067 | 35.62743 |
| 12 | 28.80232 | 30.77772 | 32.82224 |
| 13 | 23.92057 | 25.45671 | 27.04049 |
| 14 | 12.98682 | 13.78829 | 14.61277 |

INFRARED DETECTION SYSTEM

CROSS-REFERENCE TO RELATED APPLICATIONS

This application claims the benefit of priority to Japanese Patent Application Number 2017-080763 filed on Apr. 14, 2017. The entire contents of the above-identified application are hereby incorporated by reference.

BACKGROUND

Technical Field

The present disclosure relates to an infrared detection system.

At present, thermal units such as bolometers are widely used as infrared detectors. A thermal infrared detector measures temperature changes occurring when infrared light is absorbed. As such, the detector cannot respond quickly, and the wavelengths to be measured cannot be selected.

However, optical infrared detectors utilizing carrier generation from entering photons are also known. For example, with an infrared detector utilizing mercury cadmium telluride, the wavelength of the maximum sensitivity can be selected by changing the ratio of these components, and thus the detector can handle both a Mid-Wavelength Infrared Range (MWIR) and a Long-Wavelength Infrared Range (LWIR).

Quantum Well Infrared Photodetector (QWIP) and Quantum Dot Infrared Photodetector (QDIP) are known (see, for example, Shih-Yen Lin et al., "Voltage-tunable two-color quantum-dot infrared photodetectors", Appl. Phys. Lett., Vol. 95 (12), 123504-123504-3, 2009.; and Joe C. Campbell et al., "Quantum-Dot Infrared Photodetectors; By optimizing dot growth processes, materials have been produced that demonstrate potential, with further development, for high-performance infrared sensing", Proceedings of IEEE, Vol. 95 (9), 2007, pp. 1815-1827. These infrared detectors have structures in which a quantum well layer or quantum dot layer is layered as a light absorption layer, and have a characteristic of being able to shift the wavelength of maximum sensitivity by varying a bias voltage applied to the light absorption layer.

JP 10-096667 A is an example of a patent document of relation to the present disclosure. This document is to provide an automatic temperature conversion table creation method that can create a temperature conversion table in an infrared detector without taking actual measurements for each optical system configuration of lenses, window members, and filters used.

SUMMARY

The inventors of the present application investigated a system of a quantum well infrared detector or a quantum dot infrared detector in which the radiation spectrum of a measuring object is detected by sweeping a bias voltage sweep, and the temperature of the measuring object is then estimated based on the detected radiation spectrum. The inventors of the present application discovered the following problems through these investigations.

Due to the width of absorption energy of quantum dots, variations in the sizes of quantum dots, and the like, the Full Width at Half Maximum (FWHM) of the absorption wavelength for a given bias voltage may be from 2 to 3 μm. A similar FWHM may also be found in a quantum well detector. However, because far-infrared light is absorbed by gas and water vapor in the atmosphere in almost all wavelength ranges, electromagnetic waves radiated at a distance can be detected only in what is called an "atmospheric window", which corresponds to mid-wavelength infrared ranges (from 3.4 μm to 5.5 μm) and long-wavelength infrared regions (from 8 μm to 14 μm). Note that the atmospheric window for mid-wavelength infrared ranges (from 3.4 μm to 5.5 μm) is divided into a range of from 3.4 μm to 4.2 μm and a range of from 4.4 μm to 5.5 μm, but will be denoted simply as from 3.4 μm to 5.5 μm in this specification. Infrared light from 4.2 μm to 4.4 μm does not reach far distances and thus may be handled in the same manner as the range from 5.5 μm to 8 μm.

As described above, the width of the atmospheric window is approximately from 2 to 3 times the FWHM of the absorption wavelength of electromagnetic waves by a quantum well or quantum dot infrared detector. As such, when using the above-described infrared detector to detect a radiation spectrum by sweeping a bias voltage, the energy absorption ratio of the infrared detector will appear to be different between near the borders of the atmospheric window and near the center of the atmospheric window. The shape of the detection spectrum will therefore differ from the actual shape, e.g., the peak positions will be different.

Having been achieved in light of the above-described problem, one object of the present disclosure is to accurately detect a spectrum of infrared light radiated from a measuring object in an infrared detection system using an infrared detector, such as a quantum well infrared detector or a quantum dot infrared detector, that can detect infrared light while sweeping an absorption peak wavelength in the detection spectrum of the infrared light.

An infrared detection system according to an embodiment includes an infrared detector, a storage, and a correction calculator. The infrared detector is configured to detect infrared light by absorbing and photoelectrically converting infrared light of a specific wavelength range. The infrared detector is capable of sweeping an absorption peak wavelength of an absorption spectrum of infrared light. The storage is configured to store a plurality of correction coefficients for correcting a detection value from the infrared detector in accordance with the absorption peak wavelength of the infrared detector with respect to a wavelength range of an atmospheric window. The correction calculator is configured to correct the detection value from the infrared detector for each absorption peak wavelength using corresponding correction coefficients stored in the storage.

According to the above-described embodiment, the spectrum of infrared light radiated from a measuring object can be accurately detected.

BRIEF DESCRIPTION OF DRAWINGS

The invention will be described with reference to the accompanying drawings, wherein like numbers reference like elements.

FIG. 5 is a diagram illustrating an example of a correction table.

FIG. 13 is a diagram illustrating an example of a reference data table in the infrared detection system according to the sixth embodiment.

DESCRIPTION OF EMBODIMENTS

Embodiments will be described in detail hereinafter with reference to the drawings. The same reference signs will be assigned to identical or equivalent parts, and descriptions thereof will not be repeated.

First Embodiment

Configuration of Infrared Detection System

Figure 1:
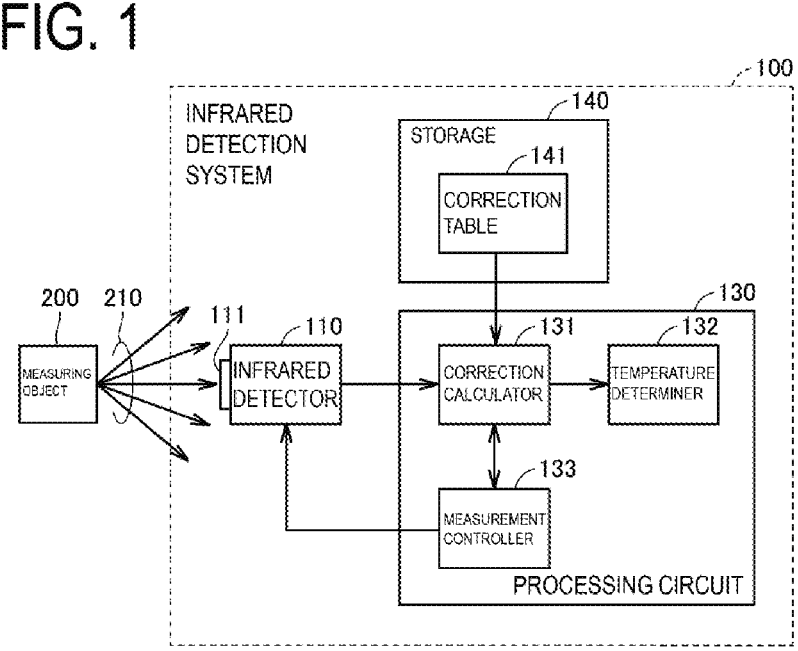
FIG. 1 is a block diagram illustrating the overall configuration of an infrared detection system according to a first embodiment.

FIG. 1 is a block diagram illustrating the overall configuration of an infrared detection system according to a first embodiment. As illustrated in FIG. 1, an infrared detection system 100 includes an infrared detector 110, a storage 140, and a processing circuit 130.

The infrared detector 110 is a photoelectric conversion element configured to absorb infrared light 210 radiated onto a light-receiving surface 111 from a measuring object 200 and converts the absorbed photons into a charge. The infrared detector 110 can detect infrared light while sweeping an absorption peak wavelength of an absorption spectrum (i.e., a wavelength where the absorption spectrum is at a peak value). A spectrum detected by the infrared detector while sweeping the absorption peak wavelength will be called a "detection spectrum" in the following descriptions.

The wavelength ranges that can be detected by the infrared detector 110 include a Mid-Wavelength Infrared Range (MWIR), i.e., infrared light in a wavelength range of from 3.4 µm to 5.5 µm, and a Long-Wavelength Infrared Range (LWIR), i.e. infrared light in a wavelength range of from 8 µm to 14 µm. These wavelength ranges are called "atmospheric windows".

A specific example of the configuration of the infrared detector 110 will be described later with reference to FIG. 2. Although FIG. 1 illustrates a single infrared detector 110, an imager constituted of a plurality of elements rather than a single element can also be used in the infrared detection system 100 of the present embodiment.

The storage 140 is configured to store, as a correction table 141, a plurality of correction coefficients for correcting detection values from the infrared detector 110 in accordance with the absorption peak wavelength of the infrared detector 110 with respect to the wavelength range of the atmospheric window. A specific example of the correction table 141 will be described later with reference to FIGS. 3 and 4.

The processing circuit 130 may be configured as a microcomputer including a processor and memory, or may be configured as a Field Programmable Gate Array (FPGA). Alternatively, the processing circuit 130 may be configured as a dedicated integrated circuit. Functionally speaking, the processing circuit 130 includes a correction calculator 131, a temperature determiner 132, and a measurement controller 133.

The correction calculator 131 is configured to correct the detection value from the infrared detector 110 based on the correction table 141. Particularly, the correction calculator 131 is configured to correct the detection value from the infrared detector 110 for each absorption peak wavelength of the infrared detector 110, using the corresponding correction coefficient stored in the storage 140.

Data obtained by using the plurality of correction coefficients to correct detection spectrum data detected by the infrared detector 110 while sweeping the absorption peak wavelength will be called "corrected spectrum data" in the following descriptions. The temperature determiner 132 determines the temperature of the measuring object 200 based on a shape of the corrected spectrum, e.g., the peak wavelength.

The measurement controller 133 is configured to control operations of the infrared detector 110. For example, the measurement controller 133 is configured to sweep the absorption peak wavelength of the absorption spectrum of the infrared detector 110 by sweeping a bias voltage applied to an infrared detection element 120.

Example of Configuration of Infrared Detector

Figure 2:
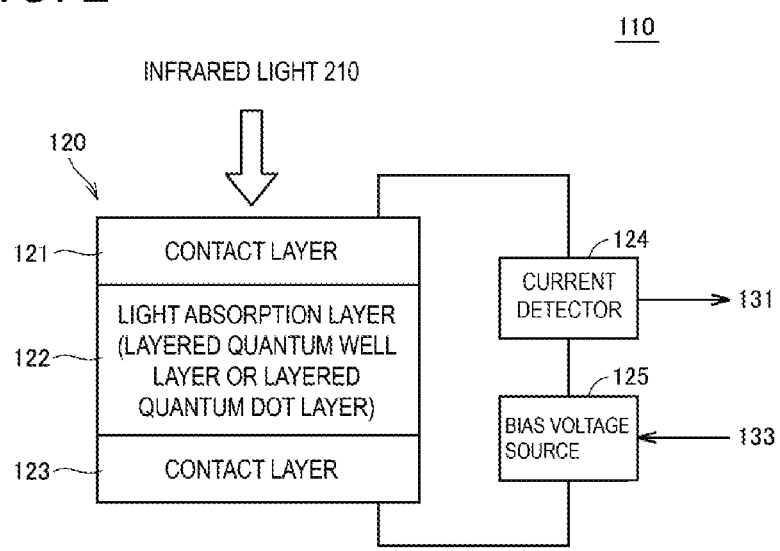
FIG. 2 is a block diagram schematically illustrating an example of the configuration of an infrared detector illustrated in FIG. 1.

FIG. 2 is a block diagram schematically illustrating an example of the configuration of the infrared detector illustrated in FIG. 1. The configuration of the infrared detector 110 illustrated in FIG. 2 is merely an example, and the configuration of the infrared detector 110 that can be applied in the infrared detection system 100 of the present embodiment is not limited to the configuration illustrated in FIG. 2.

As illustrated in FIG. 2, the infrared detector 110 includes the infrared detection element 120, a bias voltage source 125, and a current detector 124. The bias voltage source 125 and the current detector 124 may be consolidated into a single circuit.

The infrared detection element 120 includes a light absorption layer 122 and contact layers 121 and 123 arranged on respective sides of the light absorption layer 122. There may be electrode layers in contact with the contact layers 121 and 123, and in this case, the bias voltage source 125 and the current detector 124 are connected to the contact layers 121 and 123 by the electrode layers. The light absorption layer 122 has a structure in which quantum well layers and barrier layers are layered in a repeating manner (a layered quantum well layer) or a structure in which quantum dot layers and barrier layers are layered in a repeating manner (a layered quantum dot layer).

A bias voltage from the bias voltage source 125 is applied via the contact layers 121 and 123. The layered quantum well layer and the layered quantum dot layer change the infrared light absorption peak wavelength in accordance with the bias voltage through the quantum-confined Stark effect. As such, the measurement controller 133 can sweep the peak wavelength of the absorption spectrum by causing the bias voltage source 125 to vary the bias voltage. Note that the relationship between the value of the bias voltage and the absorption peak wavelength is obtained in advance through experimentation or simulations. The infrared detection element 120 may have any configuration as long as the absorption peak can be changed by varying the bias voltage. However, using quantum wells or quantum dots makes it easier to set the amount by which the absorption wavelength shifts with respect to the bias voltage value according to a material and/or a shape.

The current detector 124 is configured to detect current flowing in the infrared detection element 120. A difference between current when being irradiated by the infrared light 210 and dark current when not being irradiated by the infrared light 210 corresponds to photocurrent proportional to the intensity of the infrared light 210. Thus, the intensity of the infrared light 210 radiated from the measuring object 200 can be calculated on based on the magnitude of the photocurrent.

Method of Correcting Detection Value by Infrared Detector

Figure 3:
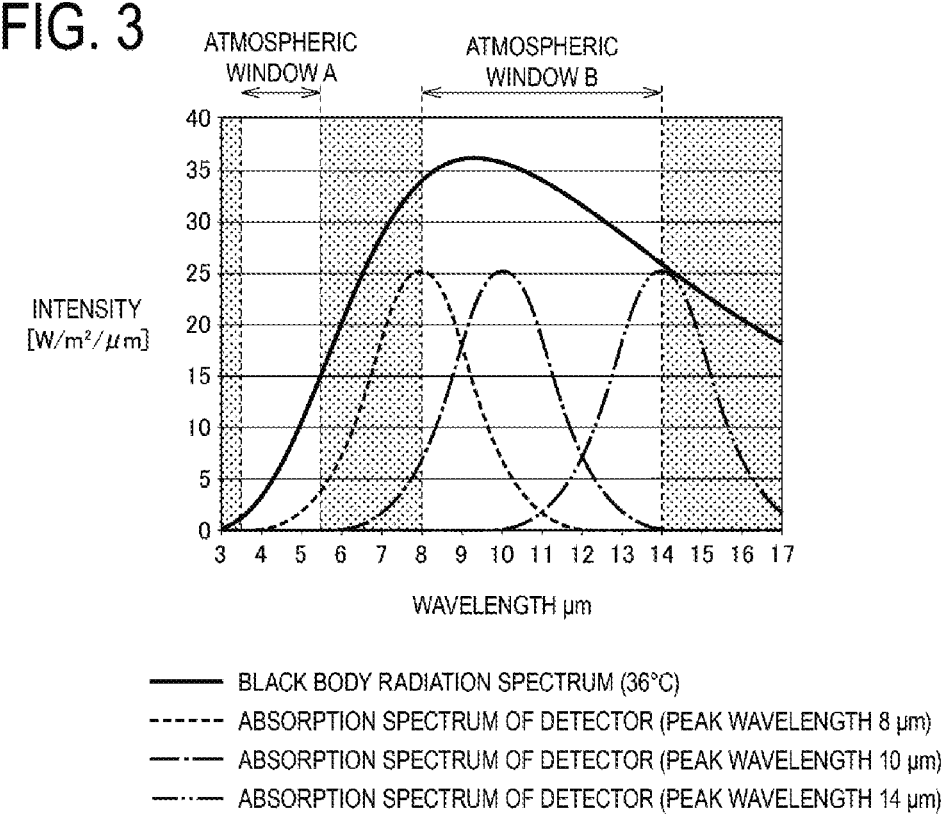
FIG. 3 is a diagram illustrating a relationship between an intensity distribution of an absorption spectrum of an infrared detector and atmospheric windows.

FIG. 3 is a diagram illustrating a relationship between an intensity distribution of the absorption spectrum of the infrared detector and the atmospheric windows.

As illustrated in FIG. 3, because far-infrared light is absorbed by gas and water vapor in the atmosphere in almost all wavelength ranges, electromagnetic waves radiated at a distance can be detected only in what is called an "atmospheric window" (an atmospheric window A and an atmospheric window B, in FIG. 3), which corresponds to a mid-wavelength infrared range (from 3.4 µm to 5.5 µm) and a long-wavelength infrared range (from 8 µm to 14 µm).

On the other hand, in the case of the quantum dot infrared detector described with reference to FIG. 2, due to the width of absorption energy of quantum dots, variations in the sizes of quantum dots, and the like, the FWHM of the absorption spectrum for a given bias voltage can be from 2 to 3 µm or greater. A similar FWHM may also be found in a quantum well infrared detector.

FIG. 3 illustrates examples in which the peak wavelength of the absorption spectrum of the infrared detector 110 is 8 µm, 10 µm, and 14 µm. However, a shape of each absorption spectrum is a Gaussian distribution, and the Full Width at Half Maximum (FWHM) of each absorption spectrum is 3 µm. For the sake of simplicity, each absorption spectrum has the same peak value in FIG. 3. However, the peak value of the absorption spectrum may be different in accordance with the absorption peak wavelength.

As illustrated in FIG. 3, the width of the atmospheric window is approximately from 2 to 3 times the FWHM of the absorption wavelength of electromagnetic waves by the infrared detector. Accordingly, approximately half of the absorption spectrum is outside the atmospheric window when the absorption peak is 8 µm and 14 µm. There are ranges of the absorption spectrum outside the atmospheric window even at absorption peak wavelengths between these peaks. As a result, compared to when the absorption peak wavelength is near the center of the atmospheric window, when the absorption peak wavelength is near a border of the atmospheric window, the detection value from the infrared detector 110 will be a lower value even in a case where the energy of the electromagnetic waves radiated from the measuring object is the same. This trend is more remarkable as the FWHM of the absorption spectrum of the infrared detector 110 gets boarder.

Figure 4:
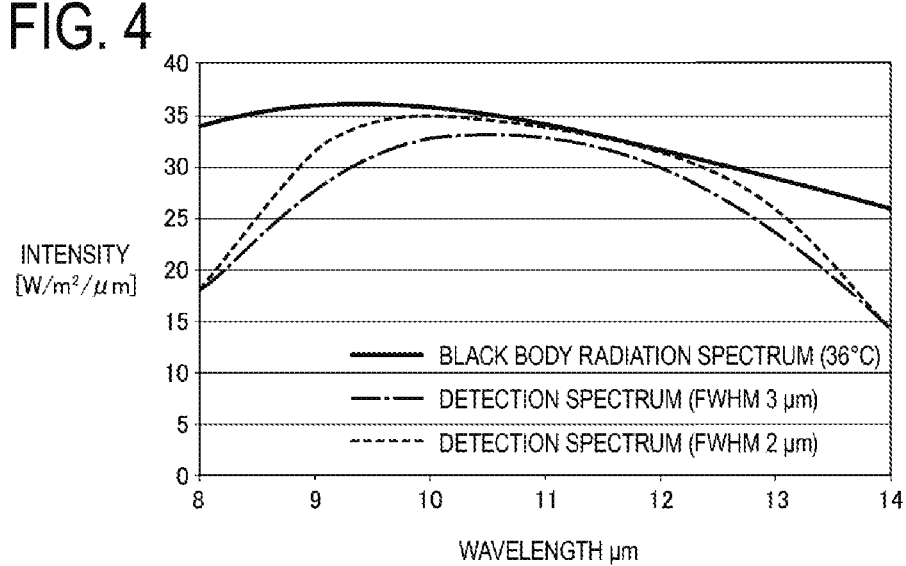
FIG. 4 is a diagram illustrating a relationship between a black body radiation spectrum at 36° C. and a detection spectrum by the infrared detector.

FIG. 4 is a diagram illustrating a relationship between a black body radiation spectrum at 36° C. and a detection spectrum by the infrared detector. In FIG. 4, the solid line graph represents the black body radiation spectrum at 36° C. The broken line graph represents the detection spectrum when the FWHM of the absorption spectrum of the infrared detector 110 is 2 µm. The dot-dash line graph represents the detection spectrum when the FWHM of the absorption spectrum of the infrared detector 110 is 3 µm.

It can be seen that due to the influence of the atmospheric windows described with reference to FIG. 3, the detection spectrum by the infrared detector 110 has a different shape (peak wavelength, curvature, and the like) from the black body radiation spectrum at 36° C. Specifically, although the black body radiation spectrum has a peak at approximately 9.4 µm at 36° C., a peak appears in the detection spectrum near 10 µm when the FWHM of the absorption spectrum of the infrared detector 110 is 2 µm. Likewise, a peak appears in the detection spectrum near 11 µm when the FWHM of the absorption spectrum of the infrared detector 110 is 3 µm. Although the emissivity drops when the measuring object is not a perfectly black body, depending on the surface shape of the measuring object, and the like, the shape of the detection spectrum does not change.

To eliminate such measurement error, correction coefficients determined for each absorption peak wavelength are stored in the storage 140 as the correction table 141. The correction coefficients change in accordance with the absorption peak wavelength of the infrared detector 110 with respect to the wavelength range of the atmospheric window. To be more precise, the inverse of a percentage that can be absorbed in the long-wavelength range atmospheric window of from 8 to 14 µm for each absorption peak wavelength of the infrared detector 110 (i.e., an effective absorption rate for each absorption peak wavelength) can be taken as the correction coefficient. The correction calculator 131 illustrated in FIG. 1 corrects the detection value from the infrared detector 110 by multiplying the value with the corresponding correction coefficient stored in the correction table 141.

FIG. 5 is a diagram illustrating an example of the correction table. In FIG. 5, values normalized by an integral of the absorption spectrum throughout the entire wavelength range and an integral of the absorption spectrum throughout a wavelength range of from 8 to 14 µm are indicated as the correction coefficients. Values approximated by Gaussian distribution as indicated in FIG. 3, or actual measured values or simulation values, may be used as the shape of each absorption spectrum. There are cases where the actual shape of the absorption spectrum is horizontally symmetrical, and cases where the peak value differs depending on the peak wavelength (the influence of these is reflected in the calculated correction coefficients). Although FIG. 5 indicates the absorption peak wavelength in 1 μm intervals, the correction coefficients are actually calculated at finer wavelength intervals.

In the correction table of FIG. 5, the correction coefficients are indicated for each peak wavelength of each absorption spectrum, but the correction coefficients may be indicated for each of bias voltages. In this case, a conversion table for converting the bias voltages into absorption spectrum peak wavelengths may be held separately in the storage 140, and the correction calculator 131 may carry out the conversion. Alternatively, the correction table may be constituted by the absorption spectrum peak wavelengths, the bias voltages corresponding thereto, and the correction coefficients for each set thereof.

Figure 6:
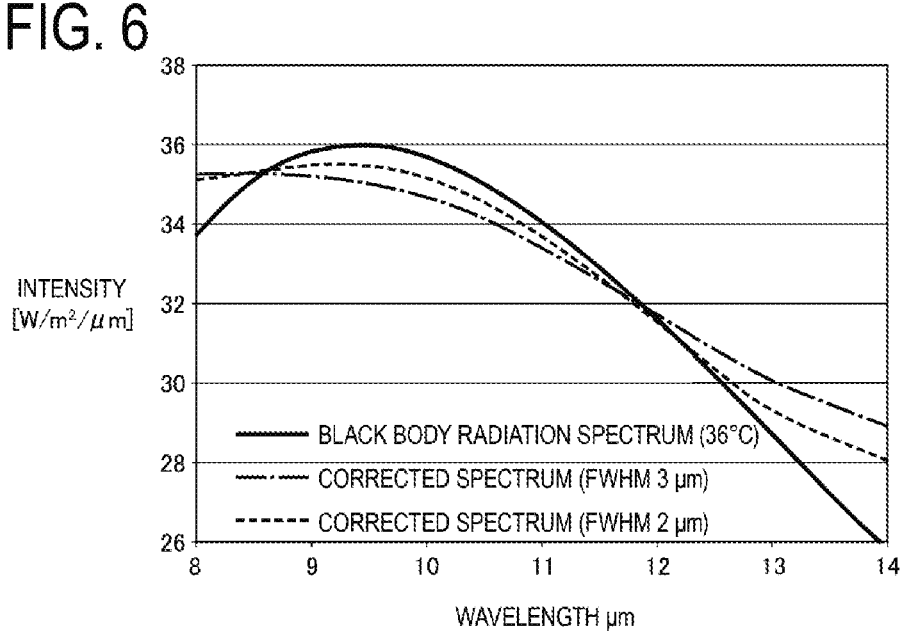
FIG. 6 is a diagram illustrating a relationship between a black body radiation spectrum at 36° C. and a corrected detection spectrum.

FIG. 6 is a diagram illustrating a relationship between a black body radiation spectrum at 36° C. and a corrected detection spectrum. In FIG. 6, the solid line graph represents the black body radiation spectrum at 36° C. The broken line graph indicates a corrected spectrum obtained by multiplying the detection spectrum from the infrared detector 110 in a case where the FWHM is 2 μm, indicated by the broken line in FIG. 4, by the correction coefficient for the case where the FWHM is 2 μm, indicated in FIG. 5. The dot-dash line graph indicates a corrected spectrum obtained by multiplying the detection spectrum from the infrared detector 110 in a case where the FWHM is 3 μm, indicated by the broken line in FIG. 4, by the correction coefficient for the case where the FWHM is 3 μm, indicated in FIG. 5.

Comparing the detection spectrum in FIG. 4 with the corrected spectrum in FIG. 6, it can be seen that the shape of the corrected spectrum in FIG. 6 is closer to the shape of the black body radiation spectrum at 36° C. For example, the black body radiation spectrum has a peak at approximately 9.4 μm at 36° C., and a peak appears in the corrected spectrum near 9.4 μm when the FWHM of the absorption spectrum is 2 μm. Likewise, a peak appears in the corrected spectrum near 10 μm when the FWHM of the absorption spectrum is 3 μm. In both cases, the value is closer to the original peak wavelength of the black body radiation spectrum at 36° C. than with the detection spectrum illustrated in FIG. 4. However, the closer to both ends of the atmospheric window (i.e., 8 μm and 14 μm), the greater the error between the original black body radiation spectrum at 36° C. and the corrected spectrum becomes.

Determining Temperature of Measuring Object

To determine the temperature of the measuring object, the temperature determiner 132 illustrated in FIG. 1 first finds the peak wavelength of the corrected spectrum. Next, the temperature determiner 132 calculates the temperature using Wien's displacement law (Wien's law), which indicates the relationship between the black body radiation peak wavelength and temperature. According to Wien's displacement law, a peak wavelength $\lambda_{max}$ [μm] is expressed as follows, using a temperature T [K]:

$$\lambda_{max} = 2.898 \times 10^3 / T \quad (1)$$

Accordingly, the temperature determiner 132 may calculate the temperature T by rearranging Formula (1) as follows:

$$T = 2.898 \times 10^3 / \lambda_{max} \quad (2)$$

Alternatively, the temperature T may be determined based on a table that holds relationships between temperatures T calculated based on Formula (2) and the peak wavelengths $\lambda_{max}$ [μm] as a database.

For example, when the corrected spectrum data with a FWHM of 2 μm indicated in FIG. 6 is used, the peak wavelength $\lambda_{max}$ is 9.4 μm, for a temperature T of 36° C., which means that the correction is essentially accurate. However, when the FWHM is 3 μm, the peak wavelength $\lambda_{max}$ is different, meaning that the temperature cannot be detected accurately. Accordingly, with the infrared detection system 100 of the present embodiment, the temperature of the measuring object can be detected more accurately in the case where the radiation peak wavelength is far from both ends of the atmospheric window, i.e., 8 μm and 14 μm, due to the FWHM being comparatively narrow or the temperature of the measuring object being low to a certain extent.

Temperature Determination Sequence

Figure 7:
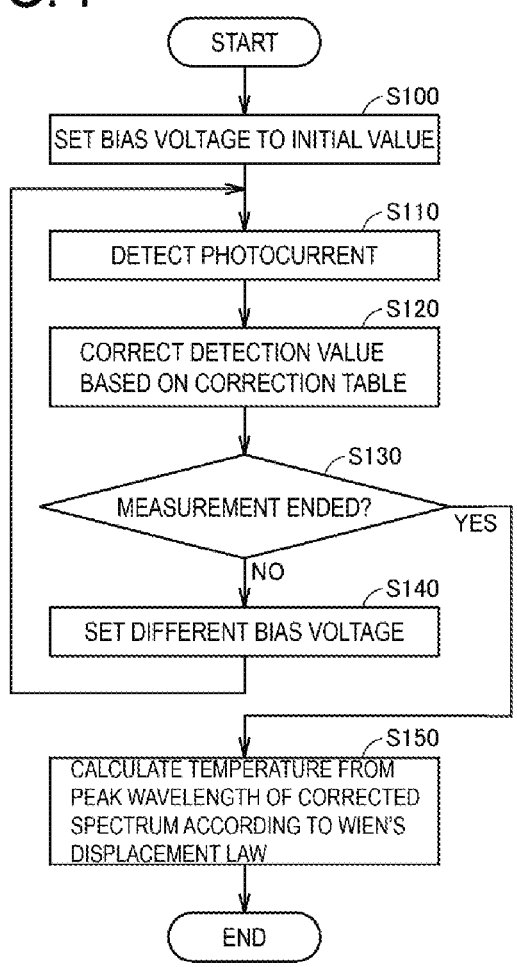
FIG. 7 is a flowchart illustrating a temperature determination sequence performed by the infrared detection system according to the first embodiment.

FIG. 7 is a flowchart illustrating a temperature determination sequence performed by the infrared detection system according to the first embodiment. The temperature determination sequence performed by the infrared detection system will be described next with reference to FIGS. 1, 2, and 7, while summarizing the descriptions given thus far.

First, in step S100, the measurement controller 133 sets the bias voltage to be applied to the infrared detection element 120 of the infrared detector 110 to an initial value. The value of the bias voltage corresponds to the peak wavelength of the absorption spectrum of the infrared detector 110.

Next, in step S110, the infrared detector 110 detects photocurrent produced by photoelectric conversion of the infrared light 210 entering from the measuring object 200 at the set bias voltage. The measurement controller 133 sets the bias voltage to correspond to the peak wavelength of each absorption spectrum.

Next, in step S120, the correction calculator 131 converts the bias voltage into an absorption peak wavelength and reads out, from the correction table 141 stored in the storage 140, the correction coefficient corresponding to the absorption peak wavelength obtained from the conversion. The correction calculator 131 then multiplies the read-out correction coefficient to correct the value detected in step S120.

Next, in step S140, the measurement controller 133 changes the bias voltage to be applied to the infrared detection element 120 of the infrared detector 110. The peak wavelength of the absorption spectrum of the infrared detector 110 is changed as a result. The above-described steps S110 and S120 are then repeated.

Once the detection of infrared light in the absorption peak wavelength range to be swept is complete, the measurement controller 133 ends the measurement (YES in step S130).

The corrected spectrum data, which is data obtained by correcting the detection spectrum data from the infrared detector 110 according to the correction table 141, is generated as a result. Then, in step S150, the temperature determiner 132 calculates the temperature from the peak wavelength of the corrected spectrum according to Wien's displacement law. This completes the temperature determination sequence.

Effects

According to the infrared detection system 100 of the present embodiment as described thus far, the detection value from the infrared detector 110 is corrected with a correction coefficient based on the absorption peak wavelength of the absorption spectrum of the infrared detector 110. Accordingly, the radiation spectrum of the measuring object and the temperature thereof can be detected accurately even in a case where the shape of the absorption spectrum of the infrared detector 110 appears to have changed in wavelength ranges near the borders of an atmospheric window.

Additionally, the above-described correction coefficient can be calculated as long as the absorption spectrum of the infrared detector 110 is known. Thus, according to the infrared detection system 100 of the present embodiment, the temperature of the measuring object can be detected more easily then when using a method in which many known temperature reference samples are prepared.

Second Embodiment

A second embodiment differs from the first embodiment in terms of the timing at which the measurement controller 133 finishes sweeping the bias voltage. Specifically, the bias voltage sweep is stopped at the point in time when the peak wavelength of the corrected spectrum is found. This makes it possible to shorten the time for measuring the temperature of the measuring object, and thus the amount of power consumed by the infrared detection system 100 can be suppressed. This will be described hereinafter with reference to the drawings.

Figure 8:
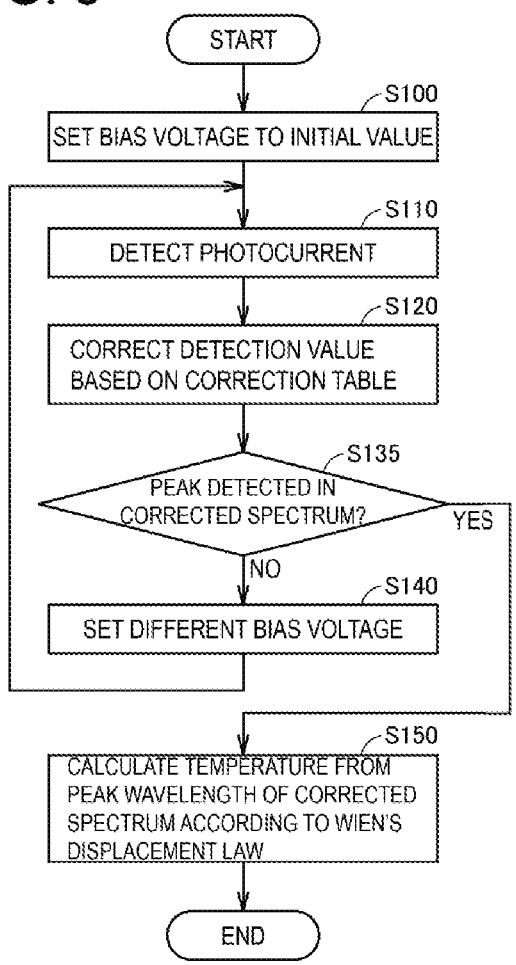
FIG. 8 is a flowchart illustrating a temperature detection sequence performed by an infrared detection system according to a second embodiment.

FIG. 8 is a flowchart illustrating a temperature detection sequence performed by the infrared detection system according to the second embodiment. The flowchart of FIG. 8 corresponds to the flowchart of FIG. 7, and differs from the flowchart in that step S135 is carried out instead of step S130.

To be more specific, in step S135, the measurement controller 133 determines whether the detection value from the infrared detector 110 corrected using the correction table 141 has indicated a peak value (maximum value), i.e., whether a peak value is present in the corrected spectrum, in the bias voltage range swept up until that point in time. In a case where a peak has been detected in the corrected spectrum (YES in step S135), the bias voltage sweep is stopped at that point in time, and the temperature determiner 132 determines the temperature of the measuring object 200 in the following step S150.

However, in a case where no peak value has been detected in the corrected spectrum (NO in step S135), in the following step S140, the measurement controller 133 changes the bias voltage to be applied to the infrared detection element 120 of the infrared detector 110. The peak wavelength of the absorption spectrum of the infrared detector 110 is changed as a result. The above-described steps S110 and S120 are then repeated.

FIG. 8 is the same as the flowchart of FIG. 7 in other respects, and thus the same reference signs are assigned to corresponding steps, and descriptions thereof will not be repeated. The configuration of the infrared detection system according to the second embodiment is also the same as that of the first embodiment, described with reference to FIG. 1, and thus descriptions thereof will not be repeated.

Third Embodiment

Figure 9:
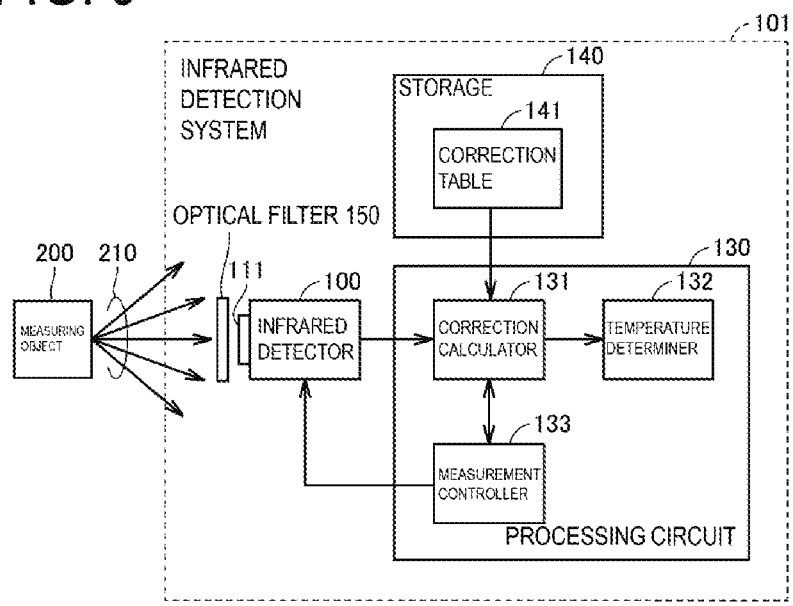
FIG. 9 is a block diagram illustrating the overall configuration of an infrared detection system according to a third embodiment.

FIG. 9 is a block diagram illustrating the overall configuration of an infrared detection system according to a third embodiment. An infrared detection system 101 illustrated in FIG. 9 differs from the infrared detection system 100 illustrated in FIG. 1 in that an optical filter 150 covering the light-receiving surface 111 of the infrared detection system 100 is further included. The optical filter 150 is configured to block the mid-wavelength infrared range of from 3.4 μm to 5.5 μm when measuring the long-wavelength infrared range of from 8 μm to 14 μm.

When the peak wavelength is 8 μm, as indicated by the broken line in FIG. 3, part of the absorption spectrum extends into the atmospheric window A of from 3.4 μm to 5.5 μm. Error will therefore arise in a case where the correction coefficient is calculated by integrating the absorption spectrum in the wavelength range of from 8 to 14 μm. However, this error can be reduced by using an optical filter to block wavelength ranges that have essentially no effect.

The optical filter 150 may be constituted by a filter configured to block the long-wavelength infrared range of from 8 μm to 14 μm, thus only the mid-wavelength infrared range of from 3.4 μm to 5.5 μm is measured. Alternatively, the optical filter may be constituted by a combination of filters configured to block a plurality of wavelength ranges, including at least a filter that blocks the mid-wavelength infrared range of from 3.4 μm to 5.5 μm and a filter than blocks the long-wavelength infrared range of from 8 μm to 14 μm.

Fourth Embodiment

An infrared detection system according to a fourth embodiment differs from the infrared detection system according to the first embodiment in that the method through which the temperature determiner 132 calculates the temperature is different. The configuration of the infrared detection system 100 is the same as in the first embodiment, described with reference to FIG. 1, in other respects, and thus detailed descriptions thereof will not be repeated.

Figure 10:
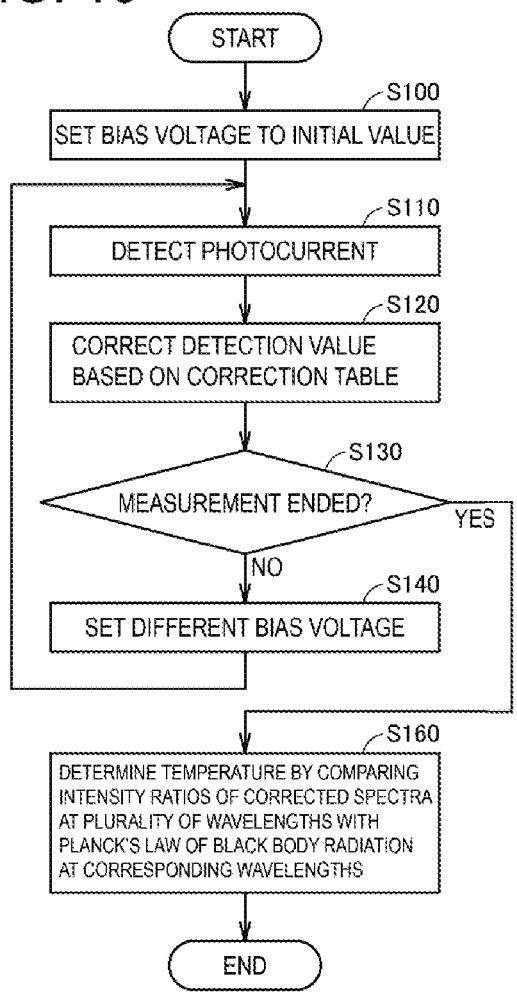
FIG. 10 is a flowchart illustrating a temperature determination sequence performed by an infrared detection system according to a fourth embodiment.

FIG. 10 is a flowchart illustrating a temperature determination sequence performed by the infrared detection system according to the fourth embodiment. Steps S100 to S140 in FIG. 10 are the same as in the first embodiment, described with reference to FIG. 7, and thus descriptions thereof will not be repeated. When these steps are executed, the infrared detector 110 generates the detection spectrum, and the correction calculator 131 generates the corrected spectrum by correcting the detection spectrum using the correction table 141.

In the following step S150, the temperature determiner 132 calculates the temperature of the measuring object 200 based on Planck's law of black body radiation, indicated below as Formula (3). In Formula (3), B(λ) represents a radiation intensity at a wavelength λ, h represents Planck's constant, c represents the speed of light, $k_B$ represents Boltzmann's constant, and T [K] represents temperature.

[Expression 1]

$$B(\lambda) = \frac{2hc^2}{\lambda^5} \frac{1}{\exp\left[\frac{hc}{\lambda k_B T}\right] - 1} \quad (3)$$

To be more specific, the temperature determiner 132 is configured to calculate an intensity ratio of corrected spectra at wavelengths $\lambda_1$ and λ2, and compares the spectrum intensity ratios with Planck's law of black body radiation at the same wavelengths $\lambda_1$ and λ2 to find the temperature T at which the ratios coincide. The temperature determiner 132 may calculate a plurality of intensity ratios of the corrected spectra at different wavelengths and compare the spectrum intensity ratios with Planck's law of black body radiation at the corresponding wavelengths to determine the temperature T through the least squares method, for example. This makes it possible to estimate the temperature T more precisely than when using only the ratio at two wavelengths.

According to the infrared detection system of the fourth embodiment as described above, the temperature of the measuring object 200 can be calculated even when there is no peak value in the corrected spectrum. The infrared detection system of the fourth embodiment can also be combined with the infrared detection systems of the second and third embodiments.

Fifth Embodiment

An infrared detection system according to a fifth embodiment is a combination of the infrared detection system of the first embodiment and the infrared detection system of the fourth embodiment, and a characteristic thereof lies in the method through which the temperature determiner 132 calculates the temperature. The configuration of the infrared detection system 100 illustrated in FIG. 1 is the same as those described in the first embodiment and the fourth embodiment in other respects, and thus detailed descriptions thereof will not be repeated.

Figure 11:
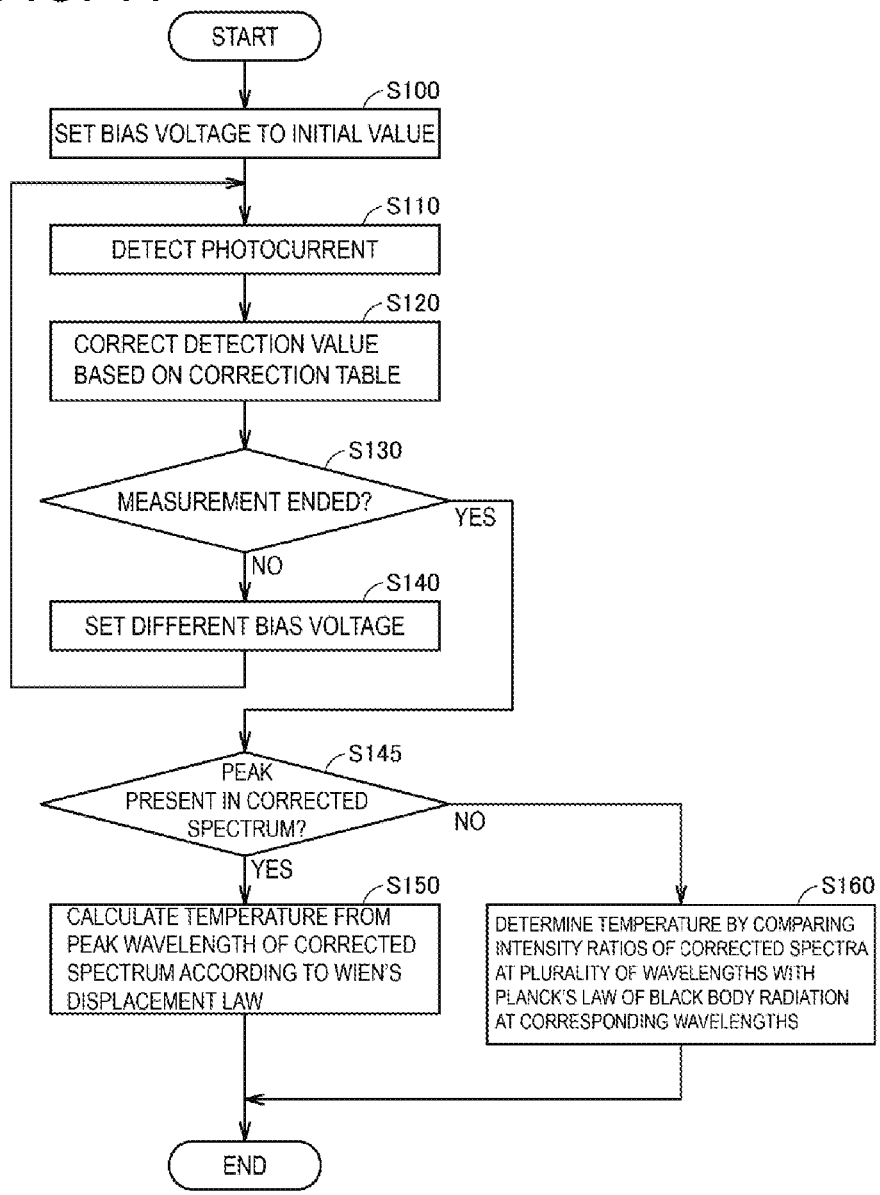
FIG. 11 is a flowchart illustrating a temperature detection sequence performed by an infrared detection system according to a fifth embodiment.

FIG. 11 is a flowchart illustrating a temperature detection sequence performed by the infrared detection system according to the fifth embodiment. Steps S100 to S140 in FIG. 11 are the same as in the first embodiment, described with reference to FIG. 7, and in the fourth embodiment, described with reference to FIG. 10, and thus descriptions thereof will not be repeated. When these steps are executed, the infrared detector 110 generates the detection spectrum, and the correction calculator 131 generates the corrected spectrum by correcting the detection spectrum using the correction table 141.

Next, in step S145, the temperature determiner 132 determines whether there is a peak value in the corrected spectrum. In a case where there is a peak value in the corrected spectrum (YES is step S145), in step S150, the temperature determiner 132 calculates the temperature from the peak wavelength of the corrected spectrum according to Wien's displacement law. On the other hand, in a case where there is no peak value in the corrected spectrum (NO in step S145), in step S160, the temperature determiner 132 calculates an intensity ratio of corrected spectra at wavelengths $\lambda_1$ and $\lambda_2$, and compares the spectrum intensity ratios with Planck's law of black body radiation at the same wavelengths $\lambda_1$ and $\lambda_2$ to find the temperature T at which the ratios coincide. The temperature determiner 132 may calculate a plurality of intensity ratios of the corrected spectra at different wavelengths and compare the spectrum intensity ratios with Planck's law of black body radiation at the corresponding wavelengths to determine the temperature T through the least squares method, for example.

According to the infrared detection system of the fifth embodiment as described above, the temperature of the measuring object 200 can be calculated regardless of whether there is a peak value in the corrected spectrum. The infrared detection system of the fifth embodiment can also be combined with the infrared detection systems of the second and third embodiments.

Sixth Embodiment

A sixth embodiment describes an infrared detection system that detects the temperature of the measuring object 200 based on a plurality of instances of reference data 142 calculated by the infrared detector 110 while sweeping a bias voltage with respect to a plurality of reference samples, each sample having a plurality of known temperatures.

Configuration of Infrared Detection System

Figure 12:
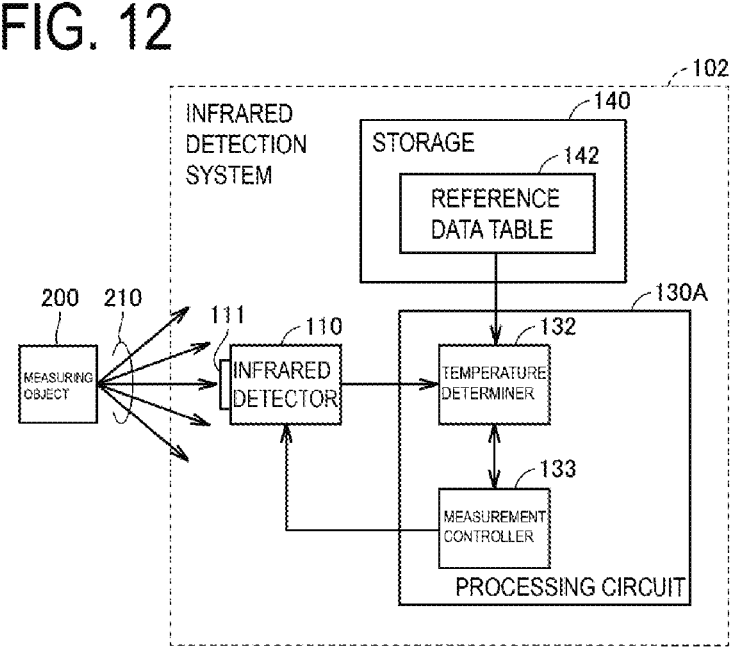
FIG. 12 is a block diagram illustrating the overall configuration of an infrared detection system according to a sixth embodiment.

FIG. 12 is a block diagram illustrating the overall configuration of the infrared detection system according to the sixth embodiment. An infrared detection system 102 illustrated in FIG. 12 is a variation on the infrared detection system 100 illustrated in FIG. 1.

Particularly, the infrared detection system 102 includes the infrared detector 110, the storage 140, and a processing circuit 130A. The functions and specific configuration of the infrared detector 110 are as described in the first embodiment with reference to FIGS. 1 and 2, and thus descriptions thereof will not be repeated.

The storage 140 stores a reference data table 142. The reference data table 142 includes a plurality of instances of reference data detected by the infrared detector 110 while sweeping a bias voltage with respect to a plurality of reference samples, each sample having a plurality of known temperatures. The reference data is detection spectrum data obtained in advance for each of the plurality of known temperatures.

The reference samples may be ideal black bodies, or may be gray bodies having known emissivity. Alternatively, the reference samples may be gray bodies with unknown emissivity, in a case where there is no wavelength dependency for the emissivity.

The processing circuit 130A may be configured as a microcomputer including a processor and memory, or may be configured as a FPGA. Alternatively, the processing circuit 130A may be configured as a dedicated integrated circuit. Functionally speaking, the processing circuit 130A includes the temperature determiner 132 and the measurement controller 133.

The temperature determiner 132 determines the temperature of the measuring object 200 by comparing detection data obtained while sweeping the bias voltage of the infrared detector 110 with respect to the measuring object 200 (this corresponds to the detection spectrum) with the reference data for each known temperature. Specifically, the temperature determiner 132 calculates a ratio between the detection data and the reference data corresponding to each known temperature on a wavelength-by-wavelength basis, and determines the temperature of the measuring object 200 based on the known temperature for the case where the wavelength dependency of the calculated ratio is the lowest. The method through which the temperature determiner 132 determines the temperature of the measuring object will be described in detail hereinafter.

Method for Determining Temperature of Measuring Object

FIG. 13 is a diagram illustrating an example of the reference data table in the infrared detection system according to the sixth embodiment. As illustrated in FIG. 13, reference data in which the reference sample temperatures are 30° C., 35° C., and 40° C. is associated with different wavelengths. Each reference data value is obtained by converting a detected photocurrent to a spectrum intensity.

Although the reference sample temperatures are set at intervals of 5° C. in FIG. 13, the temperature of the measuring object 200 can be calculated more precisely by setting the reference sample temperatures at finer intervals.

Additionally, although the wavelengths are set at intervals of 1 μm in FIG. 13, susceptibility to the effects of error can be reduced by setting the wavelengths at finer intervals, which in turn makes it possible to improve the temperature detection accuracy. On the other hand, limiting the number of wavelengths to only several wavelengths makes it possible to shorten the detection time of the infrared detector 110 and the time for calculating the temperature.

Figure 14:
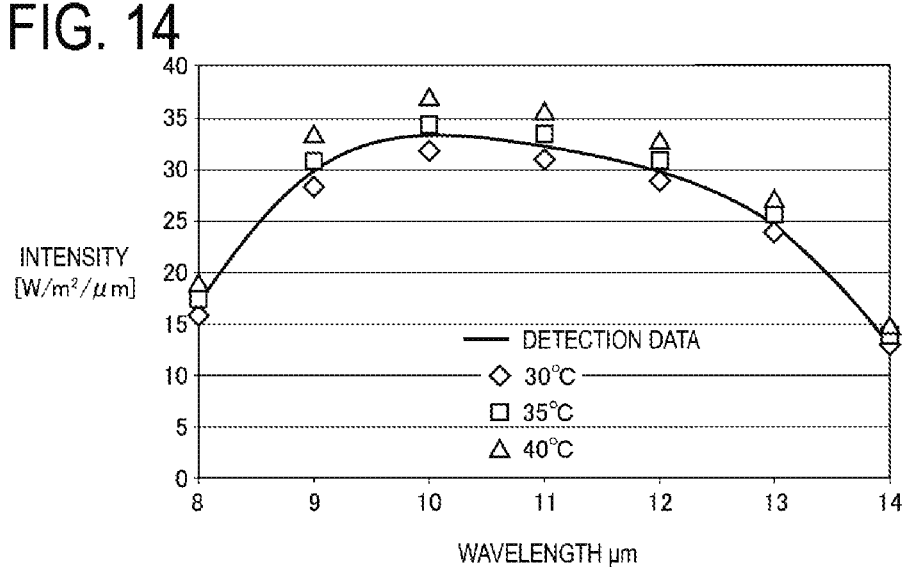
FIG. 14 is a diagram illustrating detection data of a measuring object at 36° C. with an emissivity of 0.95, and the reference data illustrated in FIG. 13.

FIG. 14 is a diagram illustrating the detection data of the measuring object at 36° C. with an emissivity of 0.95, and the reference data illustrated in FIG. 13. The solid line graph in FIG. 14 represents the detection data of the measuring object. The reference data obtained for the 30° C. reference samples is represented by the diamond-shaped points; the reference data obtained for the 35° C. reference samples, by the square points; and the reference data obtained for the 40° C. reference samples, by the triangular points.

In FIG. 14, the detection data is located between the 30° C. reference data and the 35° reference data, and thus at a glance, the data of the measuring object may be determined to be between 30° C. and 35° C. However, the above result is obtained because there is not a single emissivity for the measuring object, and thus the correct determination should be made as follows.

Figure 15:
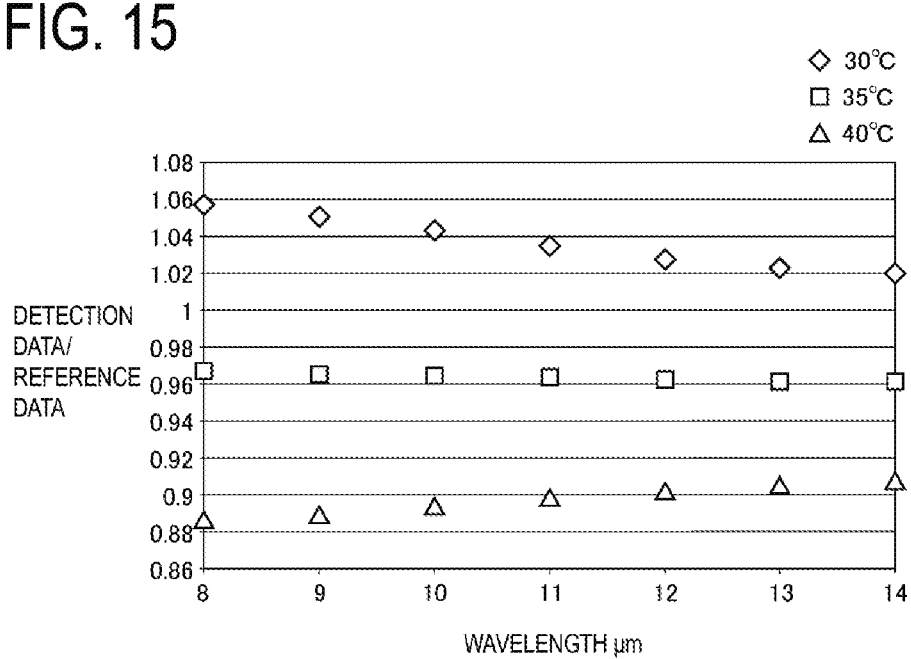
FIG. 15 is a diagram illustrating a ratio between the detection data of FIG. 14 and the reference data for each of wavelengths.

FIG. 15 is a diagram illustrating a ratio between the detection data of FIG. 14 and the reference data for each of the wavelengths. In FIG. 15, the ratio between the detection data and the 30° C. reference data is represented by the diamond-shaped points; the ratio between the detection data and the 35° C. reference data, by the square points; and the ratio between the detection data and the 40° C. reference data, by the triangular points.

From FIG. 15, it can be seen that the ratio between the detection data and the 35° C. reference data has the lowest wavelength dependency. This means that the curvature of a spectrum curve expressed by the detection data is closest to the curvature of a spectrum curve expressed by the 35° C. reference data. It can thus be concluded that the temperature of the measuring object is near 35° C.

Temperature Determination Sequence

Figure 16:
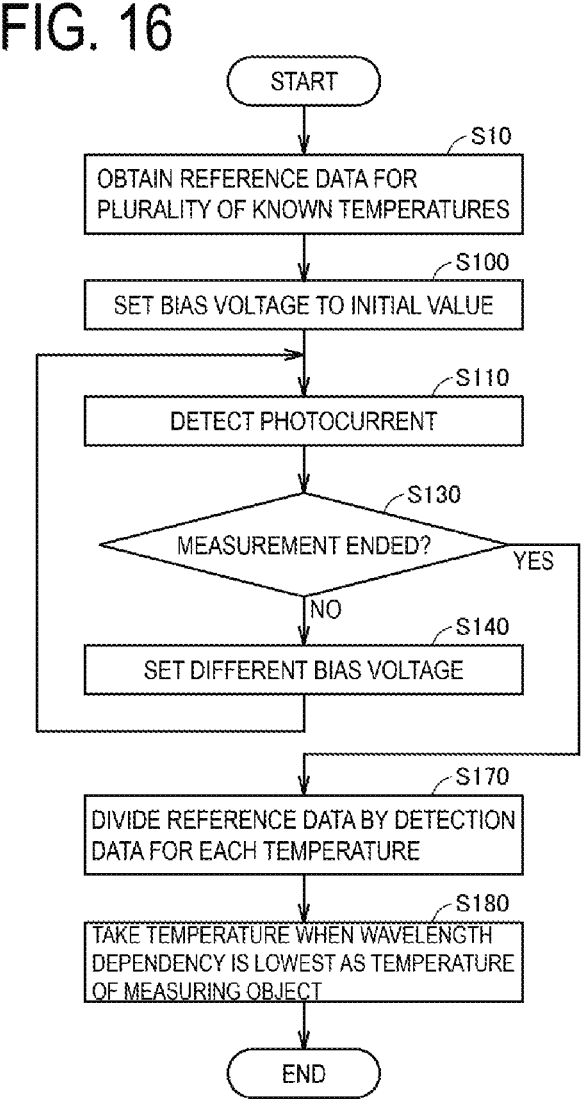
FIG. 16 is a flowchart illustrating a temperature determination sequence performed by an infrared detection system according to the sixth embodiment.

FIG. 16 is a flowchart illustrating a temperature determination sequence performed by the infrared detection system according to the sixth embodiment. The temperature determination sequence performed by the infrared detection system will be described next with reference to FIGS. 1, 12, and 16, while summarizing the descriptions given thus far.

First, in step S10, the infrared detection system 102 detects the radiation spectrum of each reference sample as the reference data by detecting a radiation intensity while sweeping the bias voltage, for each of the plurality of reference samples, each sample having a plurality of different known temperatures.

Next, the infrared detection system 102 detects the radiation spectrum of the measuring object as the detection data by detecting the radiation intensity while sweeping the bias voltage with respect to the measuring object. Specifically, this is carried out through the following procedure.

First, in step S100, the measurement controller 133 sets the bias voltage to be applied to the infrared detection element 120 of the infrared detector 110 to an initial value. The value of the bias voltage corresponds to the peak wavelength of the absorption spectrum of the infrared detector 110.

Next, in step S110, the infrared detector 110 detects photocurrent produced by photoelectric conversion of the infrared light 210 entering from the measuring object 200 at the set bias voltage.

Next, in step S140, the measurement controller 133 changes the bias voltage to be applied to the infrared detection element 120 of the infrared detector 110. The peak wavelength of the absorption spectrum of the infrared detector 110 is changed as a result. The above-described step S110 is then repeated.

Once the detection of infrared light in the absorption peak wavelength range to be swept is complete, the measurement controller 133 ends the measurement (YES in step S130). This completes the obtainment of the detection data of the measuring object.

Next, in step S150, the temperature determiner 132 divides the reference data corresponding to each known temperature by the detection data to calculate a ratio between the two on a wavelength-by-wavelength basis. Then, in step S180, the temperature determiner 132 takes the temperature corresponding to the reference data for the case where the value of the calculated ratio has the lowest wavelength dependency as the temperature of the measuring object. Specifically, the case where a difference between the ratio between the detection data and the reference data at a maximum wavelength, and the ratio at a minimum wavelength, is the lowest may be taken as the case where the wavelength dependency is the lowest.

Effects

As described thus far, according to the infrared detection system 102 of the present embodiment, the temperature of the measuring object is determined by comparing the spectra of a plurality of instances of reference data, each having a plurality of known temperatures obtained in advance, with the spectrum of the measuring object. Accordingly, the temperature of the measuring object can be determined accurately even in the case where the shape of the absorption spectrum of the infrared detector 110 appears to have changed in wavelength ranges near the borders of an atmospheric window.

Seventh Embodiment

An infrared detection system according to a seventh embodiment differs from the infrared detection system according to the sixth embodiment in that the method through which the temperature determiner 132 calculates the temperature is different. The configuration of the infrared detection system is the same as in the sixth embodiment, described with reference to FIG. 12, in other respects, and thus detailed descriptions thereof will not be repeated.

Figure 17:
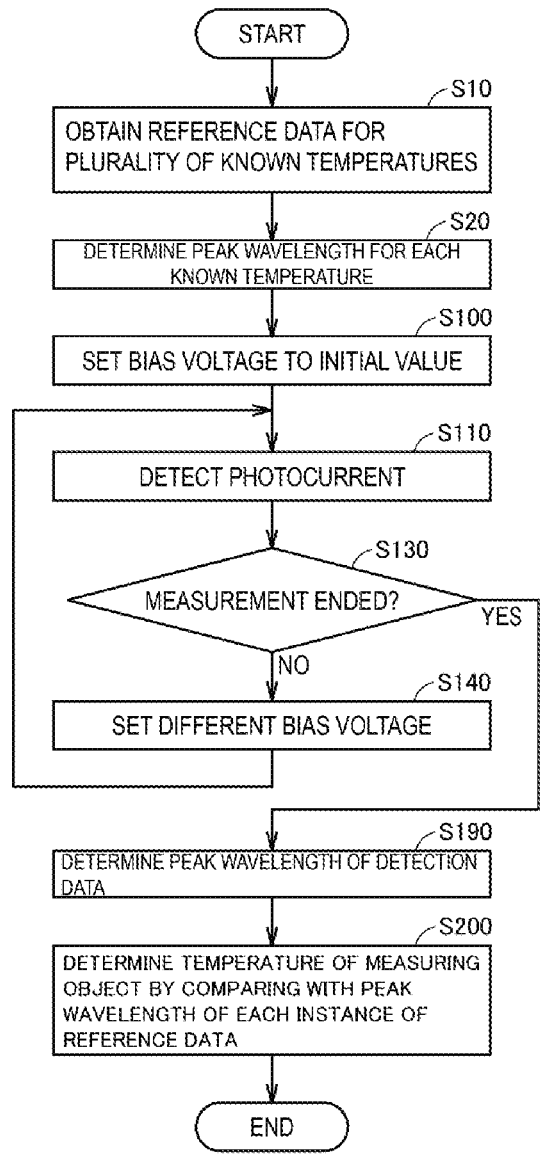
FIG. 17 is a flowchart illustrating a temperature determination sequence performed by an infrared detection system according to a seventh embodiment.

FIG. 17 is a flowchart illustrating a temperature determination sequence performed by the infrared detection system according to the seventh embodiment.

Referring to FIGS. 12 and 17, first, in step S10, the infrared detection system 102 detects the radiation spectrum of each reference sample as the reference data by detecting a radiation intensity while sweeping the bias voltage, for each of the plurality of reference samples, each sample having a plurality of different known temperatures.

Next, in step S20, the temperature determiner 132 determines a peak wavelength of each instance of reference data. The peak wavelengths obtained are stored in the reference data table 142.

Next, in steps S100 to S140, the infrared detection system 102 detects the radiation spectrum of the measuring object as the detection data by detecting the radiation intensity while sweeping the bias voltage with respect to the measuring object. The specific procedure is the same as that illustrated in FIG. 12, and thus descriptions thereof will not be repeated.

Next, in step S190, the temperature determiner 132 determines a peak wavelength of the detection data of the radiation spectrum of the measuring object. Next, in step S200, the temperature determiner 132 compares the peak wavelength of the detection data with the peak wavelength of each instance of reference data, and takes the temperature corresponding to the reference data having a matching peak wavelength as the temperature of the measuring object.

The seventh embodiment can be combined with the sixth embodiment. That is, in the case where there is a peak value in the detection data, the temperature determiner 132 can determine the temperature of the measuring object by comparing the peak wavelength of the detection data with the peak wavelength of each instance of reference data. On the other hand, in the case where there is no peak value in the detection data, the temperature determiner 132 calculates a ratio between the detection data and each instance of reference data on a wavelength-by-wavelength basis, and determines the temperature of the measuring object based on the known temperature for the case where a temperature dependency of the calculated ratio is the lowest. Accordingly, the temperature of the measuring object 200 can be calculated regardless of whether there is a peak value in the detection data.

Eighth Embodiment

An infrared detection system according to an eighth embodiment calculates a type and concentration of a gas in the atmosphere from a unique absorption wavelength of that gas, rather than calculating a temperature from the radiation spectrum of a measuring object. The measuring object is therefore a gas in the atmosphere. Instead of a specific light source that radiates infrared light, ambient thermal radiation serves as the light source. This will be described in detail hereinafter with reference to the drawings.

Configuration of Infrared Detection System

Figure 18:
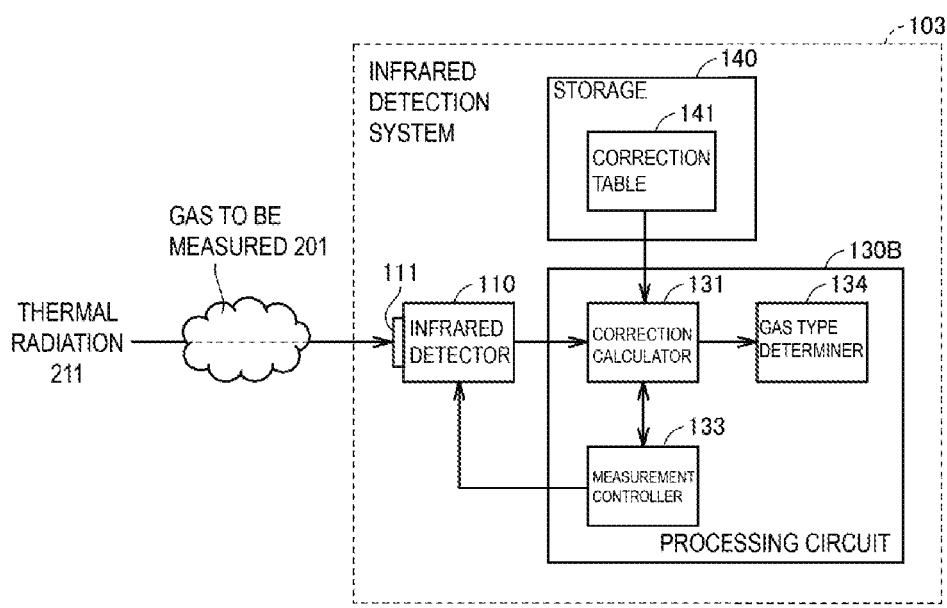
FIG. 18 is a block diagram illustrating the overall configuration of an infrared detection system according to an eighth embodiment.

FIG. 18 is a block diagram illustrating the overall configuration of the infrared detection system according to the eighth embodiment. A processing circuit 130B in an infrared detection system 103 illustrated in FIG. 18 differs from the processing circuit 130 illustrated in FIG. 1 in that a gas type determiner 134 is provided instead of the temperature determiner 132. In other respects, the configuration of the infrared detection system 103 illustrated in FIG. 18 is the same as that in FIG. 1. Identical or equivalent parts are assigned the same reference signs, and descriptions thereof will in some cases not be repeated. Note that the optical filter 150 of the third embodiment can be incorporated into the infrared detection system 103 of the eighth embodiment.

As illustrated in FIG. 18, thermal radiation 211 from an ambient heat source reaches the light-receiving surface 111 of the infrared detector 110 having passed through the atmosphere, which contains a gas 201 serving as the measuring object. The infrared detector 110 generates spectrum data by detecting the thermal radiation while sweeping an absorption peak wavelength. The correction calculator 131 generates corrected spectrum data by correcting the detection spectrum data using a plurality of correction coefficients stored in the storage 140 as the correction table 141.

The gas type determiner 134 determines the type of the gas present in the atmosphere based on a unique absorption wavelength included in the corrected spectrum data. For example, carbon monoxide has an absorption line near 4.5 µm; nitrogen monoxide, near 5.2 µm; and ozone, near 9.5 µm. These are within the wavelength range of the atmospheric window and can therefore be detected.

The gas type determiner 134 can further determine the concentration of the identified gas. Specifically, the gas concentration can be calculated based on an absorption rate obtained by dividing a post-gas production spectrum intensity by a pre-gas production spectrum intensity, an absorbance per unit of distance, and a travel distance of infrared light within the gas.

Gas Type Determination Sequence

Figure 19:
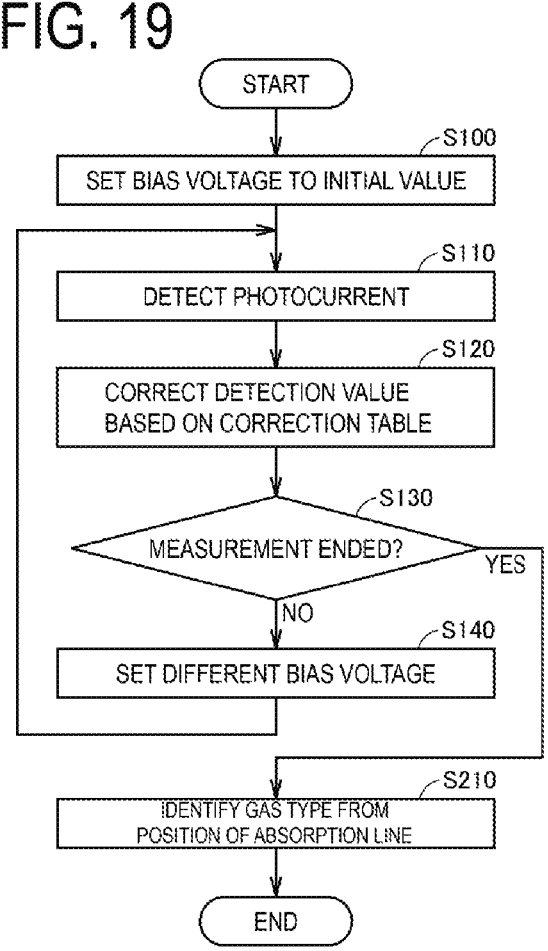
FIG. 19 is a flowchart illustrating a gas type determination sequence performed by the infrared detection system according to the eighth embodiment.

FIG. 19 is a flowchart illustrating a gas type determination sequence performed by the infrared detection system according to the eighth embodiment.

In steps S100 to S140, the infrared detector 110 detects the thermal radiation while sweeping the absorption spectrum wavelength, and the correction calculator 131 generates the corrected spectrum data by correcting the spectrum data detected by the infrared detector 110 using the correction table 141. Steps S100 to S140 are as described with reference to FIG. 7, and thus detailed descriptions thereof will not be repeated.

Next, in step S150, the gas type determiner 134 determines the type of the gas present in the atmosphere based on a unique absorption line included in the corrected spectrum data.

Effects

In a case where the spectrum data detected by the infrared detector 110 is not corrected using the correction table 141 illustrated in FIG. 18, the peak position in the spectrum data will shift, as described in the first embodiment. As a result, the type of gas present in the atmosphere will be erroneously determined.

However, according to the infrared detection system 103 of the present embodiment, the corrected spectrum data is generated by correcting the spectrum data detected by the infrared detector 110 using the correction table 141 illustrated in FIG. 18, and the type of the gas present in the atmosphere is determined based on the corrected spectrum data. As such, the type of the gas in the atmosphere can be determined accurately. Although the present embodiment describes ambient thermal radiation as the light source rather than a specific light source that radiates infrared light, a light source may be provided. In a case where no light source is provided, changes in the ambient temperature will affect the gas detection result. A thermometer may be provided in order to reduce such influence.

Addenda

Some of the characteristics of the above-described first to eighth embodiments can be summarized as follows.

[1] The infrared detection systems 100, 101, and 103 according to embodiments include the infrared detector 110, the storage 140, and the correction calculator 131. The infrared detector 110 detects infrared light by absorbing and photoelectrically converting infrared light of a specific wavelength range. The infrared detector 110 is capable of sweeping an absorption peak wavelength of an absorption spectrum of infrared light. The storage 140 stores a plurality of correction coefficients for correcting a detection value from the infrared detector 110 in accordance with a value of the absorption peak wavelength with respect to a wavelength range of an atmospheric window. The correction calculator 131 corrects the detection value from the infrared detector 110 for each absorption peak wavelength using corresponding correction coefficients stored in the storage 140.

According to this configuration, even in a case where the absorption spectrum has a broad wavelength range and the shape of the absorption spectrum of the infrared detector 110 appears to change in the wavelength range near the borders of the atmospheric window, the detection value from the infrared detector 110 can be corrected to cancel out the effects of that change. Accordingly, the spectrum of infrared light radiated from a measuring object can be accurately detected.

[2] The infrared detection systems 100, 101, and 103 according to other embodiments include the infrared detector 110, the storage 140, and the correction calculator 131. The infrared detector 110 detects infrared light by absorbing and photoelectrically converting infrared light of a specific wavelength range. The infrared detector 110 is an infrared detector that includes quantum wells or quantum dots in an active layer. The storage 140 stores a plurality of correction coefficients for correcting a detection value from the infrared detector 110 in accordance with a value of the absorption peak wavelength of the infrared detector with respect to a wavelength range of an atmospheric window. The correction calculator 131 corrects the detection value from the infrared detector 110 based on the absorption peak wavelength using a corresponding correction coefficient stored in the storage 140.

[3] In the above-described [1] or [2], the infrared detection systems 100 and 101 further include the temperature determiner 132 that determines a temperature of the measuring object 200 based on corrected spectrum data. The corrected spectrum data is obtained by using the plurality of correction coefficients to correct spectrum data detected by the infrared detector 110 while sweeping the absorption peak wavelength. Using the corrected spectrum data in this manner makes it possible to more accurately determine the temperature of the measuring object 200.

[4] In the above-described [3], the temperature determiner 132 determines the temperature of the measuring object 200 from a peak wavelength of the corrected spectrum data, in accordance with Wien's displacement law. According to this configuration, the temperature can be determined accurately from only the peak wavelength.

[5] In the above-described [4], the infrared detection systems 100 and 101 further include the measurement controller 133 that controls the sweeping of the absorption peak wavelength by the infrared detector 110. The measurement controller 133 stops the sweeping of the absorption peak wavelength by the infrared detector 110 at a point in time when the corrected spectrum data is found to have a peak. This makes it possible to shorten the time for measuring the temperature of the measuring object, and thus the amount of power consumed by the infrared detection system 100 can be suppressed.

[6] In the above-described [3], the temperature determiner 132 determines the temperature of the measuring object 200 by comparing an intensity ratio at a plurality of wavelengths in the corrected spectrum data with a ratio of spectrum intensity according to Planck's formula of radiation at the same wavelengths as the plurality of wavelengths. According to this configuration, the temperature of the measuring object 200 can be determined even in a case where no peak value is present in the corrected spectrum data.

[7] In the above-described [3], in a case where a peak value is present in the corrected spectrum data, the temperature determiner 132 determines the temperature of the measuring object 200 from a peak wavelength of the corrected spectrum data, in accordance with Wien's displacement law. In the case where there is no peak value present in the corrected spectrum data, the temperature determiner 132 determines the temperature of the measuring object 200 by comparing an intensity ratio at a plurality of wavelengths in the corrected spectrum data with a ratio of spectrum intensity according to Planck's formula of radiation at the same wavelengths as the plurality of wavelengths. According to this configuration, the temperature of the measuring object 200 can be determined regardless of whether a peak value is present in the corrected spectrum data.

[8] The infrared detection system 102 according to yet another embodiment includes the infrared detector 110, the storage 140, and the temperature determiner 132. The infrared detector 110 detects infrared light by absorbing and photoelectrically converting infrared light of a specific wavelength range. The infrared detector 110 is capable of sweeping an absorption peak wavelength of an absorption spectrum of infrared light. The storage 140 stores a plurality of instances of reference data obtained while sweeping an absorption peak wavelength of the infrared detector 110 with respect to a plurality of reference samples, each sample having a plurality of known temperatures. The temperature determiner 132 determines a temperature of the measuring object 200 by comparing detection data obtained by sweeping the absorption peak wavelength of the infrared detector 110 with respect to the measuring object 200 with the reference data for each of the known temperatures.

According to this configuration, the temperature is determined based on a comparison with reference data for each of known temperatures obtained in advance. The temperature of the measuring object can therefore be determined accurately, even in the case where the absorption spectrum has a broad wavelength range and the shape of the absorption spectrum of the infrared detector 110 appears to change in the wavelength range near the borders of the atmospheric window.

[9] The infrared detection system 102 according to yet another embodiment includes the infrared detector 110, the storage 140, and the temperature determiner 132. The infrared detector 110 detects infrared light by absorbing and photoelectrically converting infrared light of a specific wavelength range. The infrared detector 110 is an infrared detector that includes quantum wells or quantum dots in an active layer. The storage 140 stores a plurality of instances of reference data obtained while sweeping an absorption peak wavelength of the infrared detector 110 with respect to a plurality of reference samples, each sample having a plurality of known temperatures. The temperature determiner 132 determines a temperature of the measuring object 200 by comparing detection data obtained by sweeping the absorption peak wavelength of the infrared detector 110 with respect to the measuring object 200 with the reference data for each of the known temperatures.

[10] In the above-described [8] or [9], the temperature determiner 132 calculates a ratio between the reference data corresponding to each of the known temperatures and the detection data on a wavelength-by-wavelength basis, and determines the temperature of the measuring object 200 based on the known temperature in a case where a wavelength dependency of the calculated ratio is lowest. According to this configuration, the temperature can be accurately determined even when the measuring object is not a perfect black body.

[11] In the above-described [8] or [9], the temperature determiner 132 determines the temperature of the measuring object 200 by comparing a peak wavelength of the detection data with a peak wavelength of the reference data for each of the known temperatures. According to this configuration, the temperature can be determined accurately from only the peak wavelength.

[12] In the above-described [1] or [2], the infrared detection system 103 further includes the gas type determiner 134 that determines a type of a gas present in an atmosphere based on a unique absorption wavelength present in the corrected spectrum data. The corrected spectrum data is obtained by using the plurality of correction coefficients to correct spectrum data detected by the infrared detector 110 while sweeping the absorption peak wavelength. Using the corrected spectrum data in this manner makes it possible to more accurately determine the type of the gas.

[13] In the above-described [1] to [7] and [12], each of the correction coefficients is obtained from a ratio between a value obtained by integrating an absorption spectrum of the infrared detector 110 estimated for each of the absorption peak wavelengths over a wavelength range and a value obtained by integrating the absorption spectrum of the infrared detector 110 estimated for each of the absorption peak wavelengths over the wavelength range of the atmospheric window. The correction coefficients can thus be determined with ease based on the effective absorption rate for each absorption peak wavelength, and the infrared spectrum can be detected accurately.

[14] In the above-described [13], the estimated peak intensity of the absorption spectrum of the infrared detector 110 differs depending on the absorption peak wavelength. Such changes in the absorption peak wavelength can also be incorporated into the correction coefficients. In this case too, the above-described [13] makes it possible to accurately detect the infrared spectrum.

[15] In the above-described [1] to [14], the infrared detection system 101 further includes the optical filter 150 that covers the light-receiving surface of the infrared detector 110. The optical filter 150 blocks the mid-wavelength infrared range of from 3.4 µm to 5.5 µm when measuring the long-wavelength infrared range of from 8 µm to 14 µm. In this manner, error can be reduced by using an optical filter to block wavelength ranges that have essentially no effect.

[16] In the above-described [1] to [14], the infrared detection system 101 further includes the optical filter 150 that covers the light-receiving surface of the infrared detector 110. The optical filter 150 blocks the long-wavelength infrared range of from 8 µm to 14 µm when measuring the mid-wavelength infrared range of from 3.4 µm to 5.5 µm. In this manner, error can be reduced by using an optical filter to block wavelength ranges that have essentially no effect.

The embodiments disclosed here are to be understood as being in all ways exemplary and in no ways limiting. The scope of the invention is defined not by the foregoing descriptions but by the appended claims, and is intended to include all changes equivalent in meaning and scope to the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An infrared detection system comprising:
    an infrared detector element configured to detect infrared light by absorbing and photoelectrically converting infrared light of a specific wavelength range, the infrared detector element being capable of sweeping an absorption peak wavelength of an absorption spectrum of infrared light;
    a storage configured to store a plurality of correction coefficients to correct a detection value in accordance with the absorption peak wavelength of the infrared detector element with respect to a wavelength range of an atmospheric window; and
    a correction calculator configured to correct the detection value from the infrared detector element for each absorption peak wavelength using corresponding correction coefficients stored in the storage; and
    a measurement controller configured to control the sweeping of the absorption peak wavelength of the infrared detector element, wherein
    each of the correction coefficients is obtained from a ratio between a value obtained by integrating an absorption spectrum of the infrared detector element estimated for each of the absorption peak wavelengths over a wavelength range and a value obtained by integrating the absorption spectrum of the infrared detector element estimated for each of the absorption peak wavelengths over the wavelength range of the atmospheric window.

2. The infrared detection system according to claim 1, wherein the infrared detector element includes a quantum well or a quantum dot in an active layer.

3. The infrared detection system according to claim 1, further comprising:
    a temperature determiner configured to determine a temperature of a measuring object based on corrected spectrum data,
    wherein the corrected spectrum data is obtained by using the plurality of correction coefficients to correct spectrum data detected by the infrared detector element while sweeping the absorption peak wavelength.

4. The infrared detection system according to claim 3, wherein the temperature determiner determines the temperature of the measuring object from a peak wavelength of the corrected spectrum data, in accordance with Wien's displacement law.

5. The infrared detection system according to claim 4, wherein the measurement controller stops the sweeping of the absorption peak wavelength by the infrared detector element at a point in time when the corrected spectrum data is found to have a peak.

6. The infrared detection system according to claim 3, wherein the temperature determiner determines the temperature of the measuring object by comparing an intensity ratio at a plurality of wavelengths in the corrected spectrum data with a ratio of spectrum intensity according to Planck's formula of radiation at the same wavelengths as the plurality of wavelengths.

7. The infrared detection system according to claim 1, further comprising:
    a gas type determiner configured to determine a type of a gas present in an atmosphere based on a unique absorption wavelength present in the corrected spectrum data,
    wherein the corrected spectrum data is obtained by using the plurality of correction coefficients to correct spectrum data detected by the infrared detector element while sweeping the absorption peak wavelength.

8. The infrared detection system according to claim 1, further comprising:
    an optical filter configured to cover a light-receiving surface of the infrared detector element,
    wherein in the case where a long-wavelength infrared range of from 8 µm to 14 µm is measured, the optical filter blocks a mid-wavelength infrared range of from 3.4 µm to 5.5 µm.

9. The infrared detection system according to claim 1, further comprising:
    an optical filter configured to cover a light-receiving surface of the infrared detector element, wherein in the case where a mid-wavelength infrared range of from 3.4 μm to 5.5 μm is measured, the optical filter blocks a long-wavelength infrared range of from 8 μm to 14 μm.

* * * * *